United States Patent [19]

Chujo et al.

[11] Patent Number: 4,622,754
[45] Date of Patent: Nov. 18, 1986

[54] AUTOMOTIVE DRIVE GUIDE SYSTEM WITH ERROR MONITOR FOR A MAGNETIC COMPASS THEREIN

[75] Inventors: Satoru Chujo, Sagamihara; Kenichi Mitamura, Kawasaki, both of Japan

[73] Assignee: Nissan Motor Company, Limited, Kanagawa, Japan

[21] Appl. No.: 465,492

[22] Filed: Feb. 10, 1983

[30] Foreign Application Priority Data

Feb. 15, 1982 [JP] Japan .................................. 57-21305

[51] Int. Cl.⁴ .............................................. G01C 17/30
[52] U.S. Cl. ........................................ 33/356; 33/361
[58] Field of Search .......................... 33/361, 357, 356

[56] References Cited

U.S. PATENT DOCUMENTS 3,584,388  5/1968  Petrov .
3,903,610  9/1975  Heaviside et al. .
4,442,609  4/1984  Senoo .

FOREIGN PATENT DOCUMENTS 1773508  1/1973  Fed. Rep. of Germany .
2322778  2/1974  Fed. Rep. of Germany .
3136505  4/1982  Fed. Rep. of Germany .
3141439  7/1982  Fed. Rep. of Germany .

Primary Examiner—Harry N. Haroian
Attorney, Agent, or Firm—Schwartz, Jeffery, Schwaab, Mack, Blumenthal & Evans

[57] ABSTRACT

A drive guide system for an automotive vehicle indicates the remaining distance to a destination and the direction to the destination. In order to indicate the remaining distance and the direction in which to travel, travelling direction and travelling distance are detected. A direction sensor for detecting the terrestrial magnetic field is employed in the drive guide system. The direction sensor can be easily influenced by background noises in its surroundings. The background noise thus affects the detection of the direction of the terrestrial magnetism and thus causes errors in the calculation of the remaining distance and the direction to travel. Therefore, the variation of the background noise is sequentially monitored to detect the magnitude of the background noise affecting the detection of the direction, and when the variation exceeds acceptable limits, an error signal is produced.

18 Claims, 32 Drawing Figures

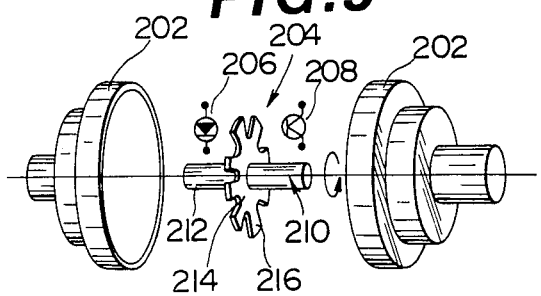
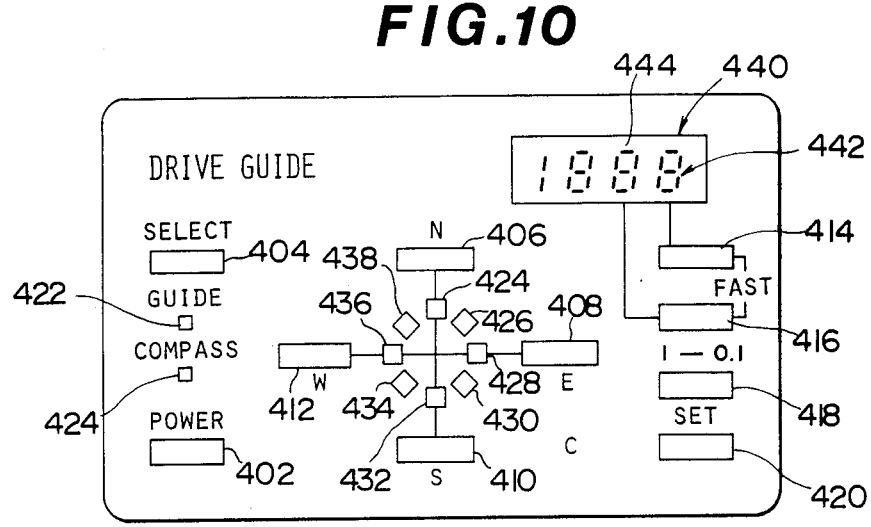
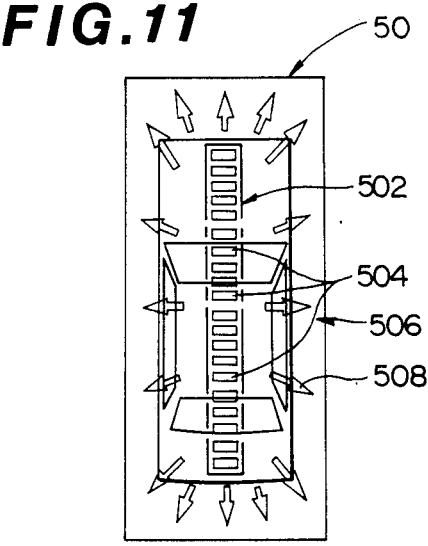

AUTOMOTIVE DRIVE GUIDE SYSTEM WITH ERROR MONITOR FOR A MAGNETIC COMPASS THEREIN

BACKGROUND OF THE INVENTION

The present invention relates generally to a drive guide system for use in an automotive vehicle, which system is to be employed during driving to show the direction and remaining distance to the destination. More particularly, the present invention relates to error correction and error monitoring for a magnetic compass detecting the terrestrial magnetism and thereby detecting the vehicle driving direction.

While driving an automotive vehicle, information concerning the direction and approximated remaining distance to the destination and so forth would be helpful to the vehicle driver. In order to provide such information, various pilot systems or drive guide systems have recently been developed. These drive guide systems are provided with sensors for detecting vehicle direction with respect to the destination, such as a gyrocompass, magnetic compass or the like. Some of such drive guide systems are provided with a magnetic compass which detects the geomagnetic field, i.e. terrestrial magnetism. Application of such a magnetic compass to an automotive drive guide system causes a problem in that since the vehicle body and vehicle device per se create a static magnetic field or some vehicle devices include magnetic materials, interference may disturb the magnetic compass and result in errors in detection of the directions. Such errors in direction detection will influence the displayed driving orientation or the direction toward the destination with respect to the driving direction or vehicle position. Therefore, correction of the detected direction by detecting the error angle of the magnetic compass is essential to keep the system effective.

If the error of the compass is due only to the interfering magnetic noise created by the vehicle per se and assuming the magnitude of the interfering magnetic noise does not change, an initial adjustment upon assembly of the vehicle may prevent the above erroneous operation of the magnetic compass. However, it is possible that the magnitude of the magnetic noise may change because the vehicle is often subjected to magnetic forces when passing through relatively strong magnetic fields, such as a railway or relatively high voltage cables. Therefore, even though initial interference of detection of the direction can be eliminated by the initial adjustment, there is rather high possibility that the magnetic compass detects the direction of the terrestrial magnetism and thus of the vehicle orientation in error to cause failure of the system operation.

SUMMARY OF THE INVENTION

Therefore, it is an object of the present invention to provide a drive guide system including a magnetic compass which detects the vehicle orientation by detecting terrestrial magnetism and by detecting the background noise component in the detected terrestrial magnetism.

Another object of the invention is to provide a drive guide system including a magnetic compass which suppresses the influence of background noise.

To accomplish the above-mentioned and other objects, there is provided, according to the present invention, a magnetic compass with a detector for detecting the background noise influencing detection of terrestrial magnetism. The magnetic compass is adapted to produce a direction signal indicative of the vehicle orientation in relation to the detected terrestrial magnetism. The direction signal has a value representative of the angular orientation of the vehicle. The detector detects the background noise component in the direction signal.

In one embodiment of the present invention, a direction sensor with an error monitor comprises first means for detecting the orientation of the terrestrial magnetism and producing a periodic first signal indicative of the direction of terrestrial magnetism, and the first signal having a signal level proportional to the magnitude of the terrestrial magnetic field, second means for producing a second signal having a value representative of a predetermined reference value which is determined based on an initial signal level of the first signal under conditions in which an initial background noise exists at a predetermined signal phase, and third means for detecting the signal level of the first signal at the predetermined phase thereof, the third means comparing the detected first signal level with the second signal value to determine the difference between the signal levels, and the third means producing a third signal when the first signal level is above the second signal level.

In another embodiment, a direction sensor with an error monitor comprises first means for producing a first signal having a value proportional to the magnitude of a first component of the terrestrial magnetic field and a second signal having a value proportional to the magnitude of a second component of the terrestrial magnetic field, phase of the second component being offset from the phase of the first component by 90°, second means for determining a background noise component in the value of the terrestrial magnetic field indicated by the first and second signal values and producing a correction signal for correcting the first and second signal values to eliminate the background noise component therefrom, and third means for producing a direction-indicative signal having a value corresponding to a detected direction, the third means being responsive to the first and second signals to arithmetically determine the direction-indicative signal value based on the first and second signal values.

According to a further embodiment of the present invention, a direction sensor with an error monitor comprises first means for producing a first signal having a value proportional to the magnitude of a first component of a terrestrial magnetism and second signal having a value proportional to magnitude of second component of the terrestrial magnetism, the phase of the second component being offset from that of the first component by 90°, second means for detecting a background noise component in the detected terrestrial magnetism based on the first and second signal values, the second means producing correction signals respectively corresponding to the background noise components in the first and second component phases, third means for correcting the first signal value with corresponding phase of the correction signal, and for correcting the second signal value with corresponding phase of the other correction signal value, and fourth means for receiving the corrected first and second signals to produce a direction-indicative signal based on the corrected first and second signal values.

According to a still further embodiment, there is provided a drive guide system for an automotive vehicle which comprises a direction sensor for detecting the orientation of the terrestrial magnetism with respect to a vehicle direction and producing a terrestrial magnetism-indicative signal having a value proportional to a magnitude of the terrestrial magnetic field, a distance sensor for detecting a travelling distance of the vehicle to produce a distance-indicative signal having a value proportional to the vehicle travelling distance, first means for processing the terrestrial magnetism-indicative signal to determine a background component therein and correcting the terrestrial magnetism-indicative signal to eliminate the background noise component therein to produce a corrected terrestrial magnetism-indicative signal, second means for determining the vehicle orientation with respect to the terrestrial magnetism based on the corrected terrestrial magnetism-indicative signal and producing a direction-indicative signal having a value indicative of the determined vehicle direction, third means for inputting data of a destination in relation to a starting point, fourth means for determining a vehicle position in relation to the starting point based on the direction-indicative signal value and the distance-indicative signal value and determining the remaining distance and the direction in which to travel toward the destination based on the destination data and the determined vehicle position data to produce a display control signal and a display unit for displaying the remaining distance and the direction in which to travel toward the destination, the display unit being responsive to the display control signal from the fourth means for updating the display.

In a further embodiment of the present invention, there is provided a drive guide system with a magnetic compass error monitor, which comprises a direction sensor for detecting the orientation of the terrestrial magnetism with respect to a vehicle direction and producing a terrestrial magnetism-indicative signal having a value proportional to a magnitude of the terrestrial magnetic field, a distance sensor for detecting a travelling distance of the vehicle to produce a distance-indicative signal having a value proportional to the vehicle travelling distance, first means for inputting destination data with respect to a starting point of the vehicle travel, second means for determining the vehicle travelling direction based on the terrestrial magnetism-indicative signal to produce a direction-indicative signal, third means for determining the vehicle position with respect to the destination based on the direction-indicative signal and the distance-indicative signal and for determining the remaining distance and the direction in which to travel toward the destination, a display unit associated with the third means for displaying the determined remaining distance and the direction to travel toward the destination, fourth means, associated with the direction sensor, to detect variation of a background noise component in the terrestrial magnetism-indicative signal to produce an error signal and an alarm unit associated with the fourth means to produce an alarm in response to the error signal.

The other objects and advantages may be understood from the detailed description given herebelow.

BRIEF DESCRIPTION OF THE DRAWINGS

The present invention will be understood more fully from the detailed description given herebelow and from the accompanying drawings of the preferred embodiments of the present invention, which, however, should not be taken as limitative to the invention but for elucidation and explanation only.

In the drawings:

FIG. 6($d$) to FIG. 6($f$) shows signal levels at the magnetic coil positions shown in FIG. 6($a$) to FIG. 6($c$), respectively.

FIG. 9 is an exploded perspective view of a vehicle travelling distance sensor as applied to the drive guide system of FIG. 1;

FIG. 10 is a front elevation of a keyboard serving as an input unit in the drive guide system of FIG. 10;

FIG. 11 is a front elevation of a display in the drive guide system of FIG. 1;

DESCRIPTION OF THE PREFERRED EMBODIMENT

Figure 1:
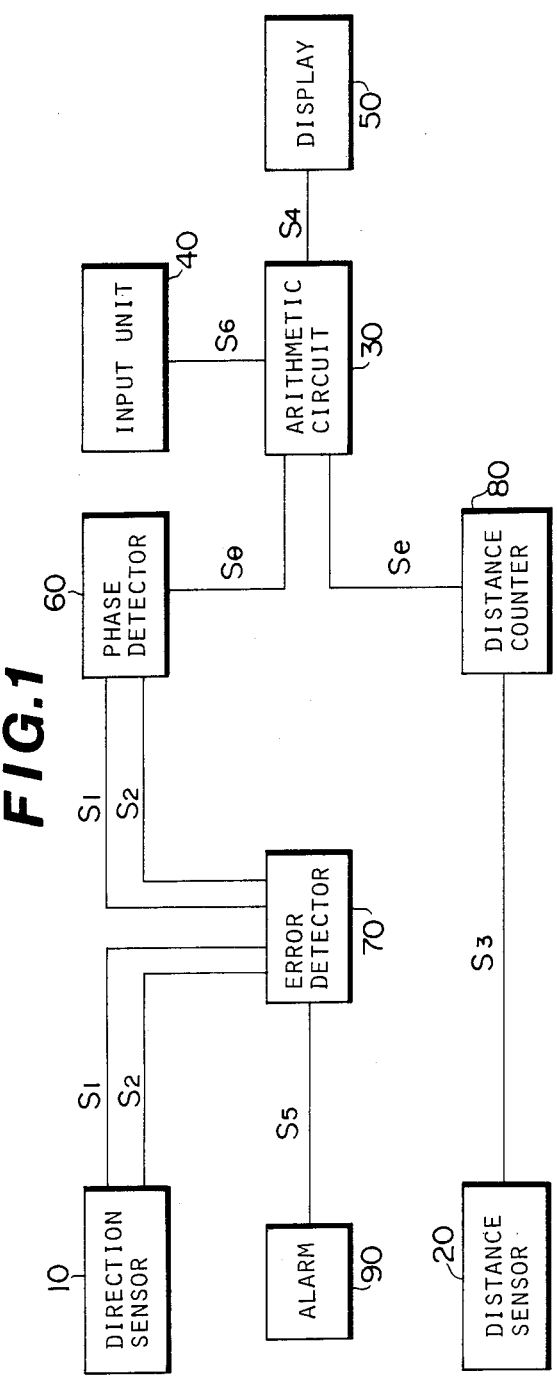
FIG. 1 is a schematic block diagram of the first embodiment of a drive guide system according to the present invention.

Referring now to the drawings, the general construction of the first embodiment of a drive guide system according to the present invention is illustrated in FIG. 1. In this first embodiment, the drive guide system indludes a direction sensor 10 for detecting the orientation of a vehicle and a distance sensor 20 for detecting the travelling distance of the vehicle. An arithmetic circuit 30 comprises a microcomputer and is associated with an input unit 40 for receiving data about the destination. The destination data is taken from a map in x- and y-coordinates with respect to co-ordinate axes centered at a starting point. The arithmetic circuit 30 processes the destination data to derive the direction to the distination with respect to the starting point and the distance between the destination and the starting point.

The arithmetic circuit 30 also receives direction data from the direction sensor 10 and distance data from the distance sensor 20. Based on the direction data and distance data, the arithmetic circuit 30 determines the vehicle position in terms of the x-y co-ordinates which will be referred to hereafter as "position data". Based on the destination data and the position data, the arithmetic circuit 30 determines the direction to the destination with respect to the vehicle position and the distance between the destination and the vehicle position.

On the basis of the determined direction to the destination and the distance therefrom, the arithmetic unit controls a display 50.

Figure 2:
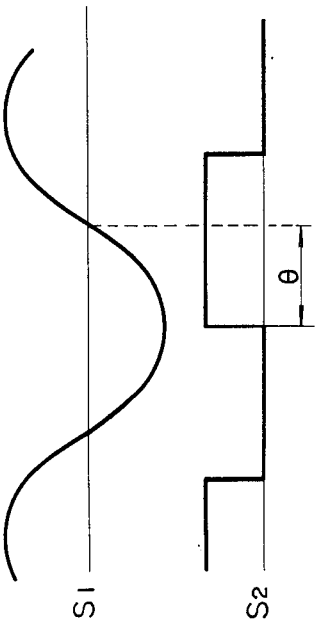
FIG. 2 is a chart illustrating a method of determining the vehicle orientation with respect to terrestrial magnetism, which is performed in the drive guide system of FIG. 1.

According to the shown embodiment, the direction sensor 10 is adapted to detect terrestrial magnetism and produce terrestrial magnetism-indicative signal $S_1$ and a reference signal $S_2$. The terrestrial magnetism-indicative signal $S_1$ is a sine-wave signal and the reference signal $S_2$ is a pulse signal, as shown in FIG. 2.

The terrestrial magnetism-indicative signal $S_1$ and the reference signal $S_2$ are both fed to a phase detector 60 via an error detector 70 which will be described in detail later. As shown in FIG. 2, the phase detector 60 detects variation of the terrestrial magnetism-indicative signal $S_1$ across 0 (zero) while increasing from negative to positive and the leading edge of the reference signal $S_2$. Based on the detected features of the terrestrial magnetism-indicative signal $S_1$ and the reference signal $S_2$, the phase detector produces a phase signal $S_\theta$ indicative of the difference $\theta$ between respective signal phases. This signal phase difference $\theta$ corresponds to the angular difference of the vehicle orientation from magnetic north. The phase signal $S_\theta$ is a binary signal representative of the vehicle orientation and thus indicative of the direction data in terms of azimuth. The azimuth is divided into a plurality of directions, for example 256, and each direction is represented by a specific binary number. In practice, the binary numbers are assigned to each direction with respect to due West, e.g., in the shown embodiment, West is 0 (zero), North is 64, East is 128 and South is 192.

On the other hand, the distance sensor 20 is adapted to produce a pulse train type distance signal $S_3$, each pulse of which is indicative of a predetermined distance of travel. The distance signal $S_3$ is fed to a distance counter 80 which counts the distance signal pulses and produces a distance-indicative counter signal $S_l$ representative of the distance the vehicle has travelled from the starting point.

The arithmetic circuit 30 receives both the phase signal $S_\theta$ from the phase detector 60 and the distance-indicative counter signal $S_l$ from the distance counter 80. Also, the arithmetic circuit 30 receives destination data from the input unit 40, which data is given in the form of x- and y-coordinates with respect to the starting point, on a co-ordinate map.

Here, assuming the x- and y-coordinates of the starting point and destination are respectively $(x_0, y_0)$ and $(x_d, y_d)$, the distance L between the starting point $(x_0, y_0)$ and the destination $(x_d, y_d)$ can be derived from the expression:

$$L = \sqrt{(x_d - x_0)^2 + (y_d - x_0)^2} \qquad (1)$$

and the direction $\theta_o$ to the destination from the starting point with respect to North can be calculated from:

$$\theta_o = \tan\theta^{-1} \frac{x_d - x_0}{y_d - y_0} \qquad (2)$$

On the other hand, assuming the vehicle travels in a direction $\theta_1$ and the accumulated distance from the starting point is $\int ds$, the current x- and y-coordinates $(x_1, y_1)$ of the vehicle can be derived from:

$$x_1 = x_0 + \cos\theta_1 \cdot \int ds \qquad (3)$$

$$y_1 = y_0 + \sin\theta_1 \int ds \qquad (4)$$

Based on the vehicle position data $(x_1, y_1)$ and the destination data $(x_d, y_d)$, the arithmetic circuit 30 calculates the distance $L_1$ between the vehicle position and the destination and the direction $\theta_a$ to the destination periodically. The arithmetic circuit 30 then produces a display control signal $S_4$ indicative of the obtained distance $L_1$ and the obtained direction $\theta_a$. The display control signal $S_4$ is fed to the display 50 to update the display.

The error detector 70 is adapted to detect the error in the terrestrial magnetism indicative signal $S_1$ to produce an alarm signal $S_5$ when the detected error exceeds a predetermined allowable range. To detect the error in the terrestrial magnetism-indicative signal $S_1$, the error detector 70 compares the signal level of the terrestrial magnetism-indicative signal to a reference value. When the difference between the terrestrial magnetism-indicative signal level and the reference value exceeds the predetermined allowable range, the alarm signal $S_5$ is fed to an alarm unit 90. The alarm unit 90 has a buzzer, an alarm lamp or the like to indicate that the error in the terrestrial magnetism-indicative signal $S_1$ exceeds the allowable range and, thus indicate that the direction sensor has failed.

Figure 3:
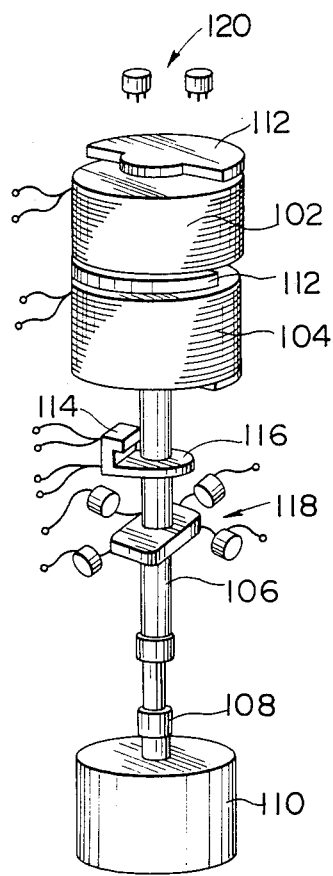
FIG. 3 is a perspective view of one embodiment of a magnetic compass used in the drive guide system of FIG. 1.
Figure 5:
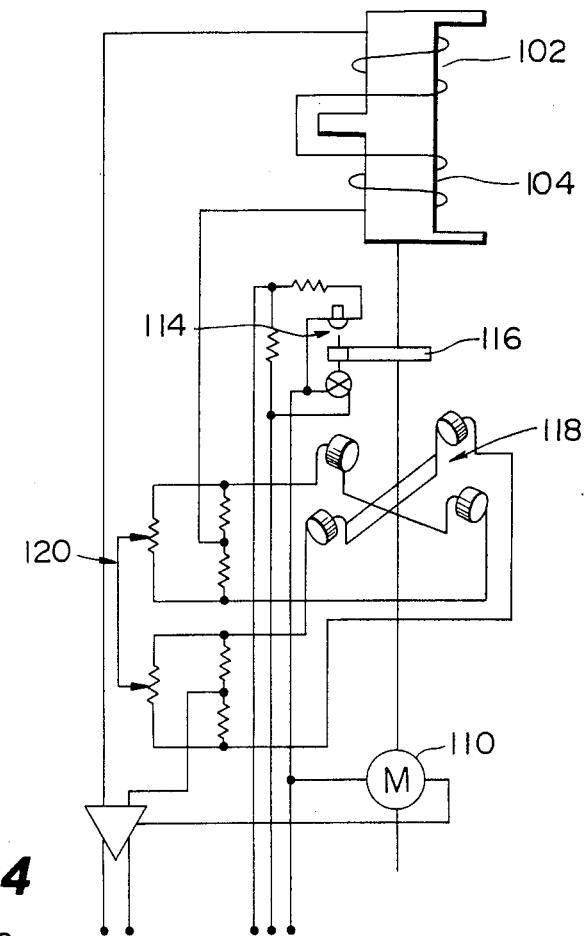
FIG. 5 is a circuit diagram of the magnetic compass of FIG. 3.
Figure 4:
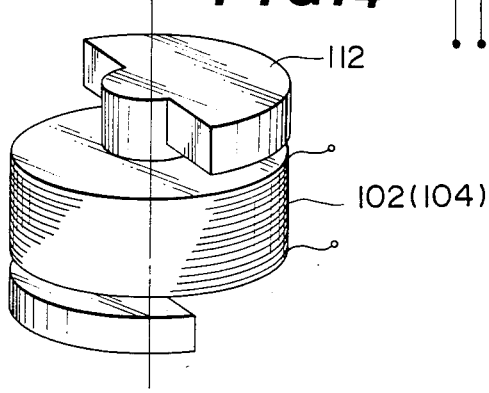
FIG. 4 is an enlarged perspective view of an essential portion of the magnetic compass of FIG. 3.
Figure 6:
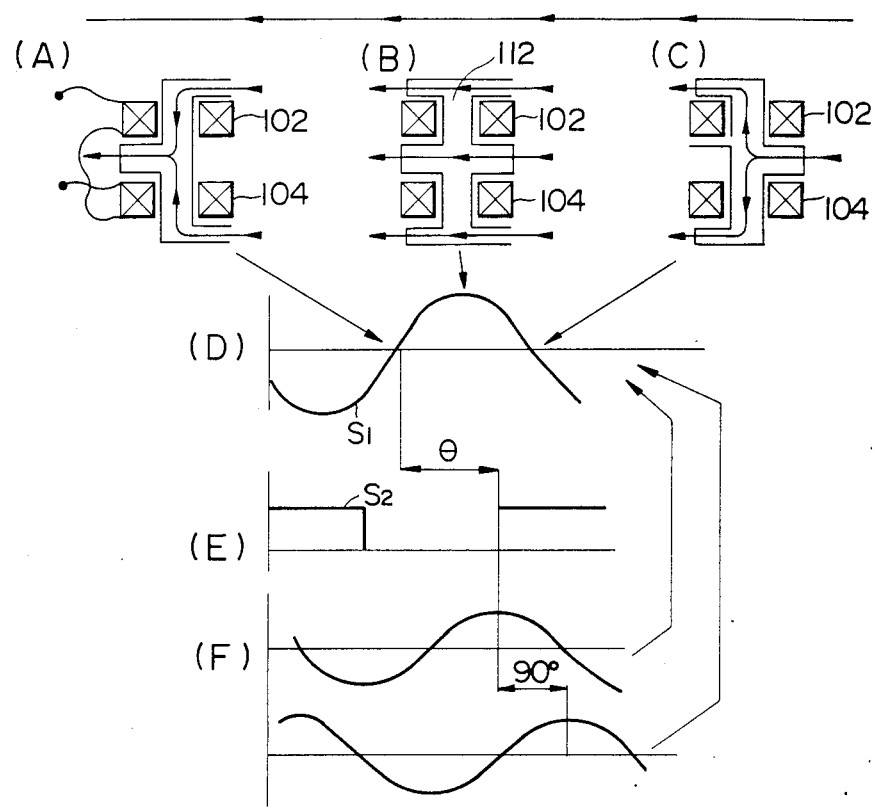
FIG. 6($a$) to FIG. 6($c$) are illustration of the operation of the magnetic coils in the magnetic compass of FIG. 3.

FIGS. 3 to 7 show details of the direction sensor 10 employed in the foregoing drive guide system. As shown in FIGS. 3 and 4, the direction sensor 10 comprises a pair of magnetic coils 102 and 104 rotatable by means of a rotary shaft 106 which is coaxially connected to the drive shaft 108 of an electric motor 110. As shown in FIG. 4, each of the magnetic coils 102 and 104 has a magnetic core 112.

The geomagnetic coils 102 and 104 are electrically connected to each other and so arranged as to eliminate variation of the combined output level in dependence on the vertical component of the terrestrial magnetic field.

The direction sensor 10 further comprises a photo-sensor 114 and a photo-interruptor 116 which detect the rotational position of the magnetic coils 102 and 104. The photo-sensor 114 produces a rectangular pulse-type reference signal $S_2$ as shown in FIG. 6(E), when the magnetic coils 102 and 104 are at a predetermined rotational position. The magnetic coils 102 and 104 are associated with each other to detect the horizontal component of the terrestrial magnetic field, as shown in FIG. 6(A) to FIG. 6(C). The magnetic coils 102 and 104 output the terrestrial magnetism-indicative sine-wave signal $S_1$, as shown in FIG. 6(D).

The direction sensor 10 also includes a correction signal generator 118 with a manually adjustable correction selector 120. The correction selector 120 serves to correct the error in the terrestrial magnetism-indicative signal due to the magnetic field of the vehicle itself by adjusting the correction signal level of the correction signal generator 118. The correction signal generator 118 produces signals as shown in FIG. 6(F) having phases offset by 90° respectively representing the East-West component and the North-South component. The correction selector 120 may be operated to adjust the terrestrial magnetism-indicative signal with respect to a magnetic compass or a direction marker 122 at a factory, as shown in FIGS. 7 and 8.

Figure 7:
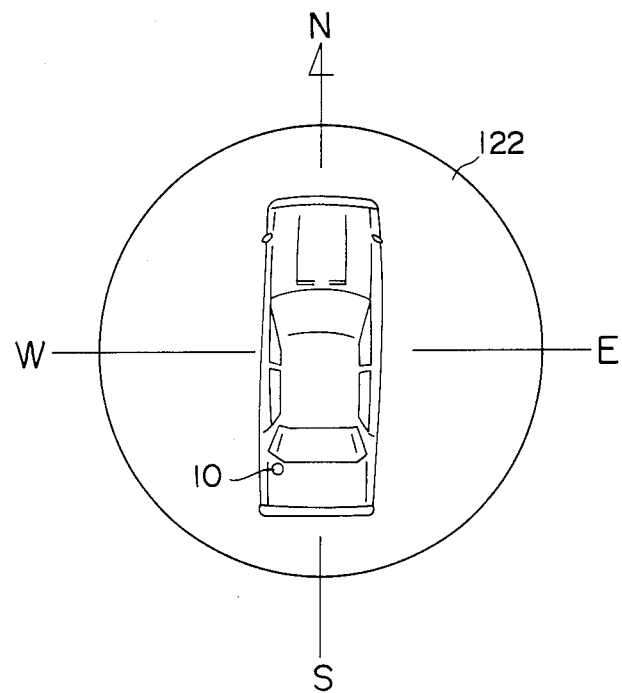
FIG. 7 is an explanatory illustration of the way in which background noise may be detected in a factory.
Figure 8:
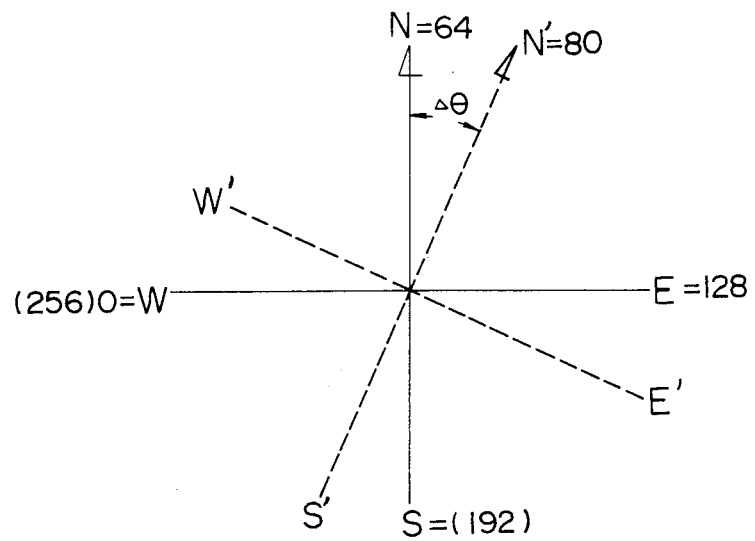
FIG. 8 is an illustration of one way of correcting the detected direction in order to eliminate the background noise influence.

In FIGS. 7 and 8, the vehicle with the direction sensor 10 is placed on the direction marker 122 and aligned to the North. In this position, the terrestrial magnetism-indicative signal $S_1$ is checked to detect the error Δ, as indicated by broken lines in FIG. 8.

Similar direction sensors for detecting vehicle orientation may be seen in SAE/SP.80/458/S02.50 entitled "Magnetic Field Sensor and Its Application to Automobiles" by Hisatsugu Ito et al, published by Society of Automotive Engineering, Inc. The recitation in the above-identified SAE paper is hereby incorporated by reference.

FIG. 9 shows the distance sensor 20 in the drive guide system of FIG. 1. The distance sensor 20 is installed along a speedometer cable to produce a pulse-type distance signal having a frequency proportional to the vehicle speed. The distance sensor 20 comprises a sensor housing 202 stationarily mounted on the speedometer cable, a photo-interrupter 204 having a photo-emitter 206 and a photo receptor 208, and a shutter 210. The shutter 210 has a rotational shaft 212 coaxially secured to the speedometer cable for rotation therewith. A shutter disc 214 with a plurality of shutter blades 216 is fixed to the rotational shaft for rotation in synchronism with vehicle travel. The shutter blades 216 are adapted to interrupt the light between the photo-emitter 206 and the photo receptor 208 as the shaft 212 rotates. Whenever the light is interrupted, the photo receptor 208 produces a HIGH-level signal which serves as the pulse-type distance signal $S_3$. In the shown embodiment, the number of shutter blades is 8 (eight) to produce 8 pulses per cycle of speedometer cable rotation.

FIG. 10 shows the details of the input unit 40 in the drive guide system of FIG. 1. The input unit 40 has a power switch 402, a mode selector switch 404, direction keys 406, 408, 410, and 412, distance keys 414 and 416, unit-distance selector key 418 and a set switch 420. The power switch 402 is interpositioned in a power circuit (not shown) to control the ON/OFF condition of the system, i.e., the power switch 402 is adapted to turn the system ON and OFF. However, the switch 402 is not connected to a memory for storing input data so that the input data may be preserved even when the power switch is OFF. The input data may be cleared by turning off an accessory switch (not shown) actuated by an ignition key.

The mode selector switch 404 is adapted to switch the function mode of the drive guide system between GUIDE mode in which direction and remaining distance to the destination are displayed and COMPASS mode in which vehicle orientation is displayed. The mode selector switch 404 is associated with indicators 422 and 424 respectively turned ON when the corresponding function mode is selected. The direction keys 406, 408, 410 and 412 are operable in the COMPASS mode to input direction data. Each of the direction keys is adapted to increment or decrement the direction data at a given timing. Corresponding to incrementing or decrementing of the direction data, one of indicators 424, 426, 428, 430, 432, 436 or 438 turns ON in sequence. When the indicator 424 corresponding to North is ON the input data, i.e. the direction data, may have the value 64 representative of the direction North as set forth previously. If the direction key 408 is then depressed, the value of the direction data is incremented to turn ON the indicators 426 and 428 in sequence. When the indicator 428 is turned ON, the direction key 408 may be released and the direction data has been updated to have the value 128 representative of the East.

The distance key 414 is associated with the least significant digit 442 of a display 440 to change the displayed number sequentially at a given timing as long as it is depressed, which stops changing when the distance key 414 is released. In the display 440, the least significant digit is independent of the others so that as that digit changes from nine to zero, the other digits remain unchanged. The distance key 416 is associated with a digit 444 next to the least significant digit 442 of the display 440 to change the displayed digit sequentially at a given timing as long as it is depressed, which stops changing when the key 416 is released. In this case, when the digit changes from nine to zero, the next most significant digit increases by one. The input unit 40 produces a set-distance-indicative signal $S_6$ having a value representative of the display value.

In setting the destination data ($x_d$, $y_d$), the distance keys 414 and 416 are operated twice to set each of the x- and y-coordinates of the destination as indicated by the map. By operating the distance keys 414 and 416, the x-coordinate data and y-coordinate data of the destination are inputted in relation to the starting point ($x_0$, $y_0$). The set-distance-indicative signals $S_6$ respectively representative of x- and y-coordinates of the destination are fed to the arithmetic circuit 30 and stored therein.

FIG. 11 shows a display 50 comprising a distance indicative element 502 including a plurality of bar-graph segments 504 and a direction-indicative element 506 having a plurality of arrow-shaped segments 508. The distance-indicative element 502 is adapted to indicate the remaining distance to the destination. Each of the bar-graph segments 504 is adapted to indicate a percentage of travel in relation to an initial distance between the starting point and the destination. In the shown embodiment, the distance-indicative element 502 is adapted to highlight the remaining distance to travel to the destination. Therefore, each distance-indicative element is turned off in order as the vehicle approaches the destination. On the other hand, the arrow-shaped segments 508 of the direction-indicative element 506 respectively represent the direction toward the destination with respect to the vehicle orientation. Therefore, according to the direction toward the destination, one of the arrow-shaped segments 508 lights up. The display method of the display 50 is as shown in FIG. 12(a) to FIG. 12(d).

Figure 12:
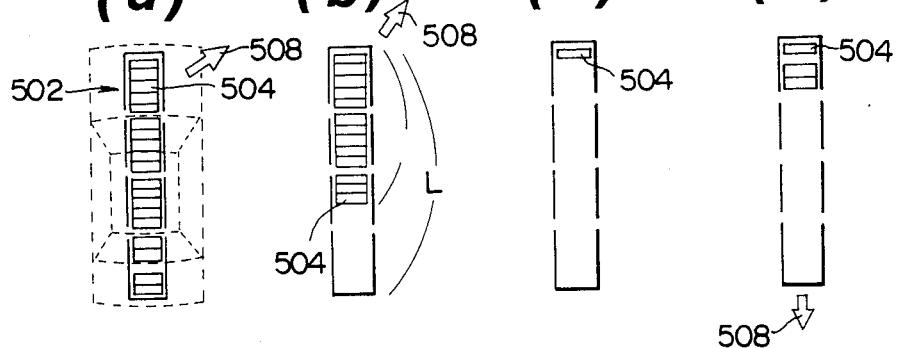
FIGS. 12($a$) to 12($d$) respectively show the direction and remaining distance displays at the points a, b, c, d in FIG. 13.
Figure 13:
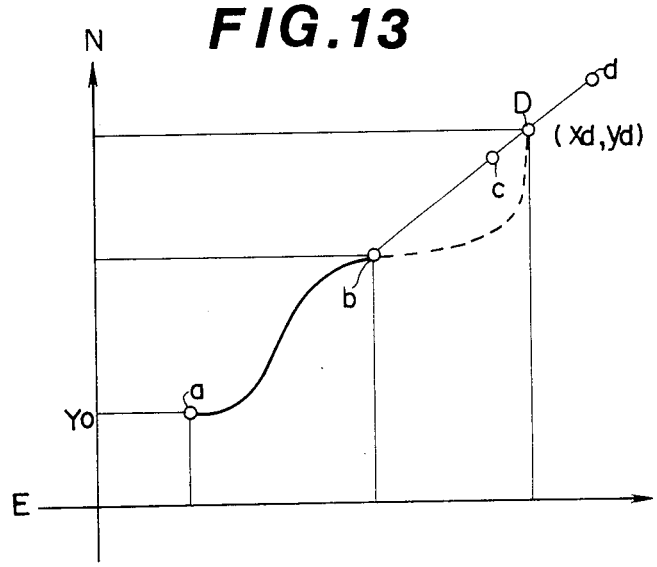
FIG. 13 is an illustration of an exemplary vehicle travelling route from a starting point a to a destination D.

The function of the display 50 as illustrated in FIGS. 12(a) to 12(d) will be described briefly with respect to the exemplary vehicle route as illustrated in FIG. 13. In FIG. 13, the point a ($x_0$, $y_0$) is a starting point at which the display is as shown in FIG. 12(a). The point D is the destination ($x_d$, $y_d$) picked out on the map. The points b and c respectively represent intermediate travelling points. At the point b, the display 50 displays the remaining distance and the travel direction as shown in FIG. 12(b). At the point c which is close to the destination D, the display 50 shows that the vehicle is close to the destination by flashing the last bar-graph segment 504, as shown in FIG. 12(c). When the vehicle passes the destination and reaches the point d, the display increases the number of illuminated bar-graph segments 504 and indicates a rearward direction with the arrow-shaped segment 508, as shown in FIG. 12(d).

Figure 14:
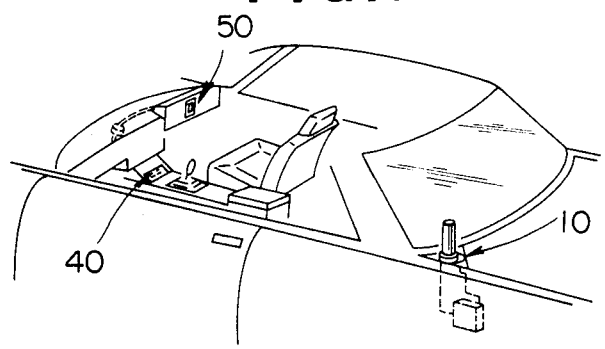
FIG. 14 shows an exemplary arrangement of the foregoing magnetic compass (serving as the direction sensor), the distance sensor, the keyboard and the display in an automotive vehicle.

An exemplary arrangement of the direction sensor 10, the input unit 40 and the display 50 is illustrated in FIG. 14. Although the shown arrangement may be the most convenient for operation and display, the arrangement can be modified in any way.

Figure 15:
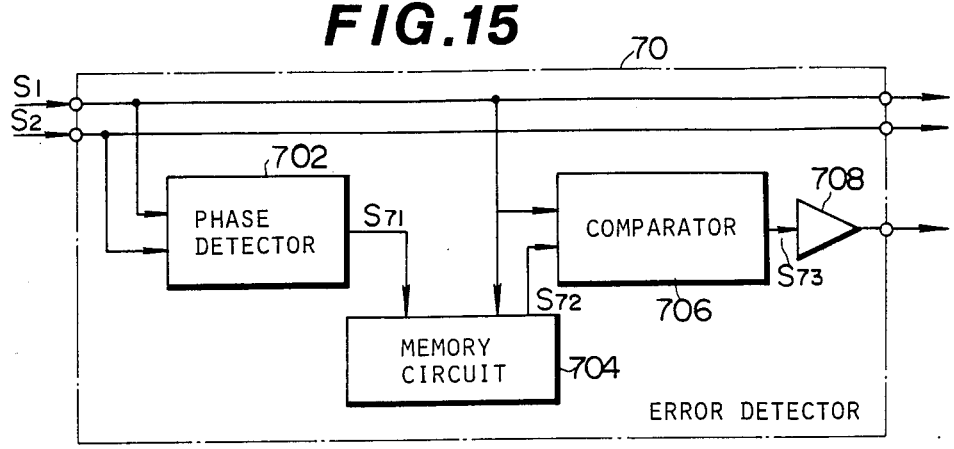
FIG. 15 is a block diagram of an error detector in the drive guide system of FIG. 1.
Figure 16:
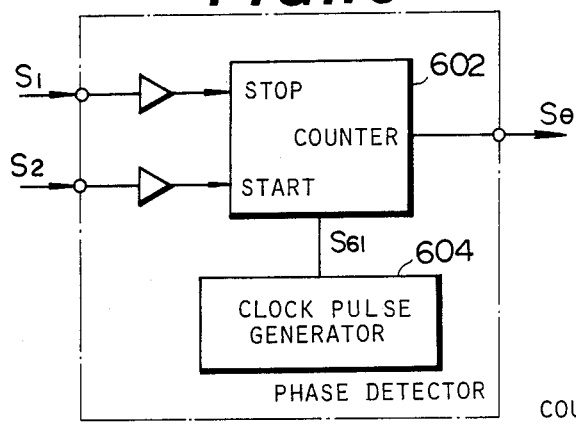
FIG. 16 is a block diagram of a phase detector in the drive guide system of FIG. 1.
Figure 18:
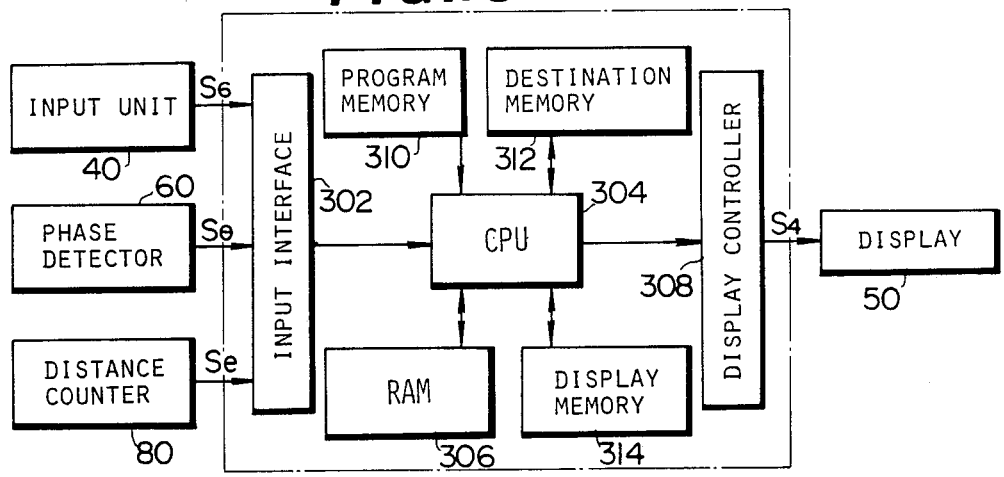
FIG. 18 is a block diagram of an arithmetic circuit in the drive guide system of FIG. 1.

FIGS. 15, 16 and 18 respectively show details of the circuit elements in the drive guide system of FIG. 1. FIG. 15 shows the error detector 70, FIG. 16 shows the phase detector 60 and FIG. 18 shows the arithmetic circuit 30.

As shown in FIG. 1, the error detector 70 is interpositioned between the direction sensor 10 and the phase detector 60. As shown in FIG. 15, the error detector 70 comprises a second phase detector 702, a memory circuit 704, a comparator 706 and an amplifier 708. The phase detector 702 is substantially the same circuit as illustrated in FIG. 16. As set forth previously, the phase detector 702 is adapted to detect the vehicle orientation by detecting the difference between the phases of the terrestrial magnetism-indicative signal $S_1$ and the reference signal $S_2$ as shown in FIG. 2. The phase detector 702 produces a detector signal $S_{71}$ having a value representative of the detected phase difference. The detector signal $S_{71}$ is fed to the memory circuit 704. The terrestrial magnetism-indicative signal $S_1$ is also inputted to the memory circuit directly from the direction sensor 10.

The memory circuit 704 holds a reference value corresponding to a signal level of the terrestrial magnetism-indicative signal $S_1$ to be compared with the current value thereof. The memory circuit 704 outputs the stored value to the comparator 706 as a reference signal $S_{72}$. The comparator 706 thus receives the reference signal and the terrestrial magnetism-indicative signal $S_1$ directly from the direction sensor 10 to compare the signal levels thereof. The comparator 706 is adapted to produce a comparator signal $S_{73}$ when the difference between the signal levels of the terrestrial magnetism-indicative signal $S_1$ and the reference signal $S_{72}$ is greater than a predetermined threshold. The comparator signal $S_{73}$ is outputted to the alarm unit 90 via the amplifier 708 to produce an alarm.

Figure 17:
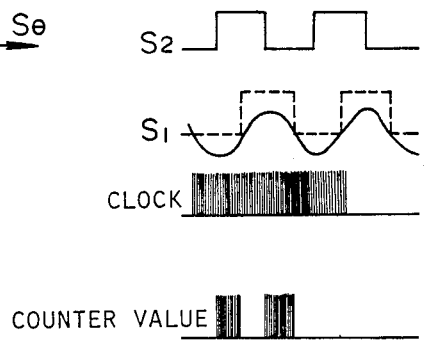
FIG. 17 is a timing chart of the operation of the phase detector of FIG. 16.

The phase detector 60, as shown in FIG. 16, comprises a counter 602 and a clock pulse generator 604 for producing a reference pulse signal $S_{61}$ having a predetermined frequency. The reference signal $S_{61}$ may serve as a clock for measuring the interval $\tau$ between the positive-going zero point $p_1$ of the terrestrial magnetism-indicative signal $S_1$ and the rising edge of the reference signal $S_2$ as shown in FIG. 17. The counter 602 receives the terrestrial magnetism-indicative signal $S_1$ at its stop or reset terminal and receives the reference signal $S_2$ at its start terminal. In response to the reference signal $S_2$, the counter 602 becomes operative to count the reference pulses $S_{61}$ as clock pulses and produces a counter signal serving as a phase signal $S_\theta$ having a value representative of the counter value. The counter 602 is responsive to the terrestrial magnetism-indicative signal $S_1$ to stop counting and latch the final counter value. Therefore, in response to the terrestrial magnetism-indicative signal $S_1$, the counter 602 outputs the latched value of the phase signal $S_\theta$ to the arithmetic circuit 30.

As shown in FIG. 18, the arithmetic circuit 30 comprises a microcomputer including an interface 302, a CPU 304, RAM 306 and a display controller 308. In addition, the arithmetic circuit 30 includes a program memory 310, a destination memory 312 and display memory 314. The interface 302 receives the set-distance indicative signal $S_6$ from the input unit 40, the phase signal $S_\theta$ from the phase detector 60 and the distance-indicative counter signal $S_l$ from the distance counter 80. The CPU processes the set-distance-indicative signal $S_6$ from the input unit 40 to store the x- and y-coordinates of the destination in the destination memory 312.

In the program memory 310, there is stored a program to be executed periodically and continuously to determine the co-ordinates of the vehicle position and determine the distance between the vehicle position and the destination and the direction in which to travel. The program is executed at a given timing and thus the CPU 304 produces the display control signal $S_4$ at the same timing. The display control signal $S_4$ is representative of the determined distance and direction to the destination and is outputted to the display 50 via the display controller 308. The CPU 304 outputs a vehicle position-indicative signal $S_{31}$ to the display memory 314 to update the contents of the latter.

The general concepts of error detection will be explained below with reference to FIGS. 19 and 20 in which signal levels are represented by the magnitude of corresponding vectors.

Figure 19:
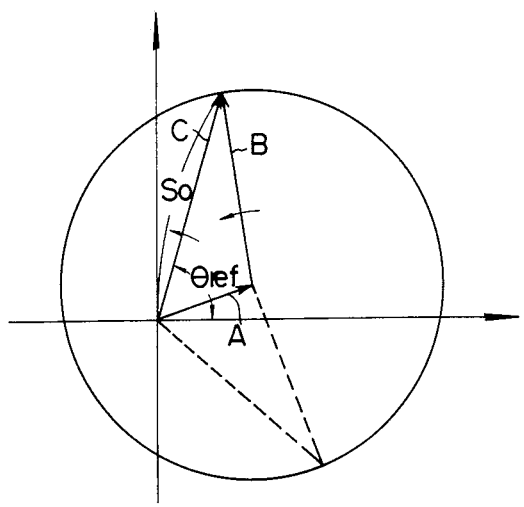
FIG. 19 is an illustration of the relationship between the magnitude of terrestrial magnetism, the magnitude of the magnetic compass output and the background noise, which shows the influence of the background noise on detection of terrestrial mgnetism.
Figure 20:
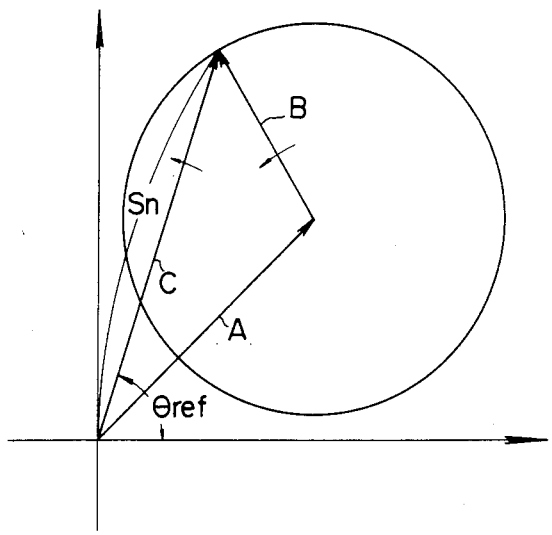
FIG. 20 is an illustration similar to FIG. 19 but showing the magnetic compass condition when the background noise level exceeds a predetermined acceptable level.

In FIG. 19, a vector C representative of the signal level of the terrestrial magnetism-indicative signal $S_1$ can be expressed as the sum of a vector A which represents the magnetic field generated by the vehicle itself and a vector B which is representative of the vehicle orientation. The vector A can therefore be considered to be background noise influencing the signal level of the terrestrial magnetism-indicative signal $S_1$ from the direction sensor 10 used to detect the vehicle direction. As will be apparent from FIG. 19, as long as the magnitude of the background noise as represented by the vector A remains at a substantially constant value as initially detected, the magnitude of the vector C at a specified reference phase $\theta_{ref}$ will also be constant.

As set forth previously, the background noise created by the magnetic field of the vehicle itself is variable and will increase when the vehicle passes through a relatively strong magnetic field such as below high-voltage cables or across a railway. When the background noise increases, the magnitude of vector C will increase since it is the resultant sum of the vectors A and B. This variation can be seen in FIG. 20. As will be appreciated from FIG. 20, due to the increase in the background noise as represented by the vector A, the magnitude of the vector C representative of the signal level of the terrestrial magnetism-indicative signal $S_1$ is increased correspondingly.

Therefore, by comparing the signal level of the terrestrial magnetism-indicative signal $S_1$ with a signal level effected only by the initial background noise, variation of the background noise can be detected.

In the error detector 70 of FIG. 15, the memory circuit 704 stores the reference value representative of the signal level of the terrestrial magnetism-indicative signal $S_1$ including only initially detected background noise. The memory circuit 704 receives the detector signal $S_{71}$ indicative of the phase. When the detector signal $S_{71}$ has a value corresponding to the predetermined phase $\theta_{ref}$, the stored reference value is read out and fed to the comparator 706 as the reference signal $S_{72}$. The comparator also receives the terrestrial magnetism-indicative signal $S_1$ to be compared to the reference signal level. If the difference between the signal levels of the terrestrial magnetism-indicative signal $S_1$ and the reference signal $S_{72}$ exceeds a predetermined value, the comparator 706 outputs via the amplifier 708 the comparator signal $S_{73}$ to activate the alarm unit 90.

Figure 21:
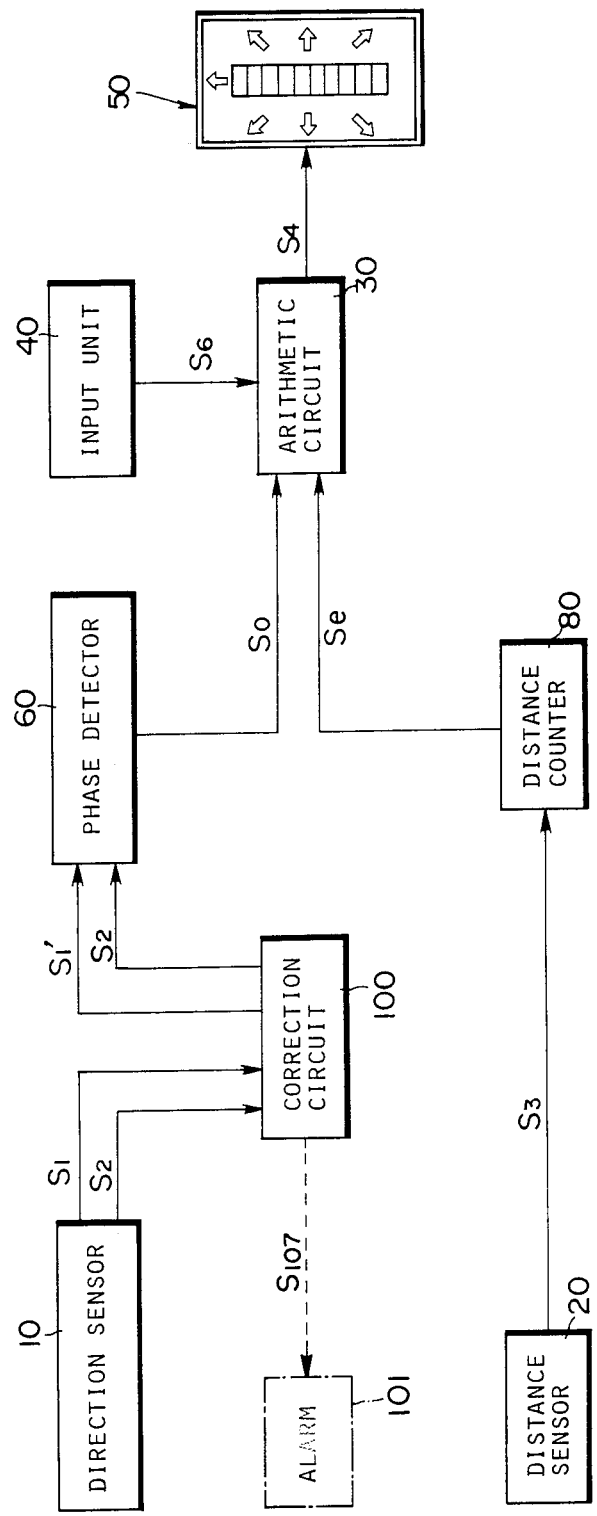
FIG. 21 is a schematic block diagram of the second embodiment of the drive guide system according to the present invention.

Referring to FIG. 21, there is illustrated the second embodiment of the drive guide system in which is provided a correction circuit 100 as a substituted for the error detector in the foregoing first embodiment. In this second embodiment, the correction circuit 100 is adapted to eliminate the influence of the background noise due to the magnetic field of the vehicle itself. Therefore, the terrestrial magnetism-indicative signal $S_1$ from the direction sensor 10 is corrected by the correction circuit 100 to be compensated for background noise.

To briefly summarize system operation, the direction sensor 10 outputs the terrestrial magnetism-indicative signal $S_1$ and the reference signal $S_2$ as in the foregoing first embodiment. The terrestrial magnetism-indicative signal $S_1$ is corrected by the correction circuit 100 to eliminate the influence of background noise. The corrected terrestrial magnetism-indicative signal $S_1'$ and the reference signal $S_2$ are outputted to the phase detector 60. The phase detector 60 produces the detector signal $S_{74}$ having a value representative of the difference between the phases of the terrestrial magnetism-indicative signal $S_1$ and the reference signal $S_2$ and indicative of the vehicle orientation.

The distance sensor 20 produces the distance signal $S_3$ and outputs it to the distance counter 80. The distance counter 80 counts the distance signal pulses $S_3$ to produce the distance-indicative counter signal $S_l$. The distance-indicative counter signal $S_l$ and the detector signal $S_{74}$ are fed to the arithmetic circuit 30.

As set forth previously, the arithmetic circuit 30 is associated with the input unit 40 and the display 50. Based on the destination data from the input unit 40 and the detector signal $S_{74}$ and the distance-indicative counter signal $S_l$, the arithmetic circuit 30 determines the current vehicle position with respect to the destination to thereby determine the remaining distance and the direction to travel to the destination. The arithmetic circuit 30 produces the display control signal $S_4$ to update the display 50 based on the result of the arithmetic operation.

Figure 22:
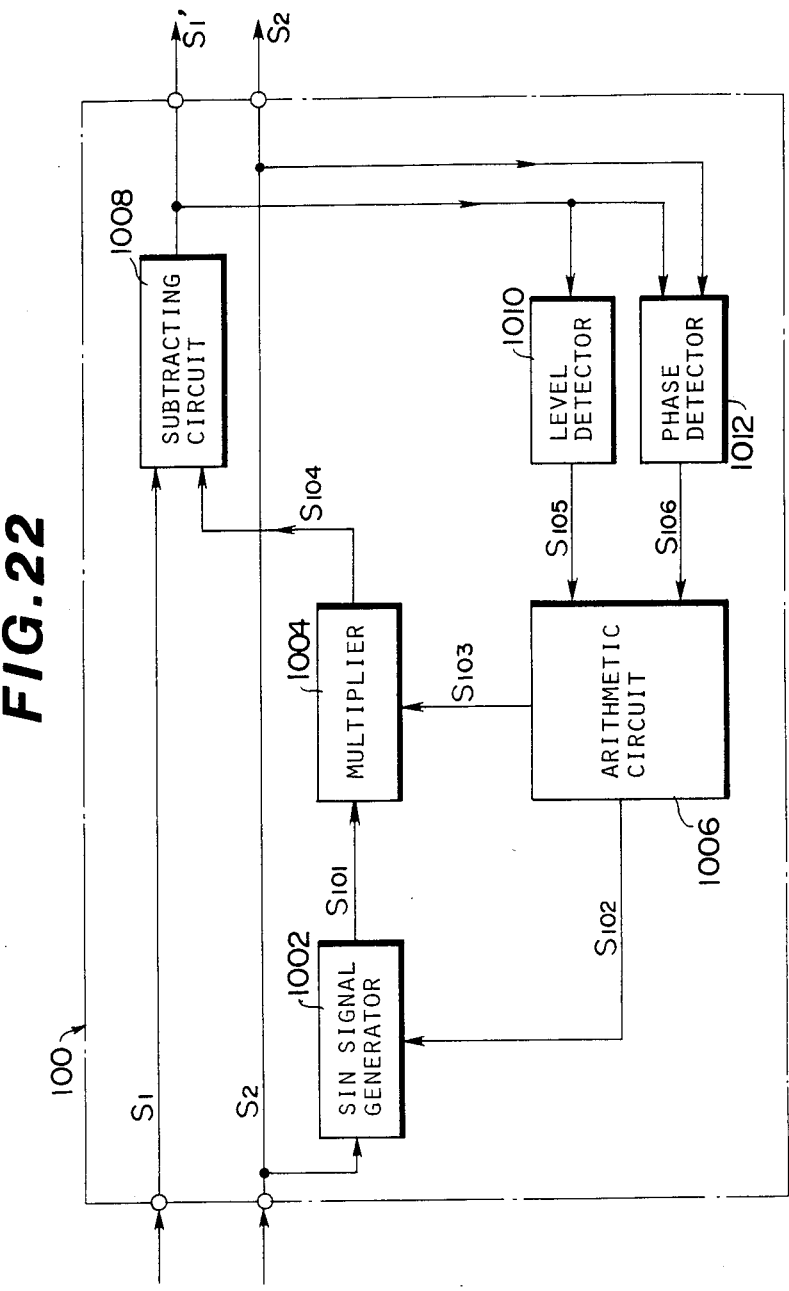
FIG. 22 is a block diagram of details of the correction circuit in the drive guide system of FIG. 21.

FIG. 22 shows details of the correction circuit 100 in the second embodiment of the drive guide system of FIG. 21. The correction circuit 100 comprises a sine-wave signal generator 1002, a multiplier 1004, an arithmetic circuit 1006, a subtracting circuit 1008, a level detector 1010 and a phase detector 1012. The sine-wave signal generator 1002 receives the reference signal $S_2$ from the direction sensor 10 and produces a sine-wave signal $S_{101}$ at a given phase lag $\theta_d$ with respect to the reference signal $S_2$. The sine-wave signal generator 1002 is also associated with the arithmetic circuit 1006 to receive therefrom the phase difference indicative signal $S_{102}$. The sine-wave signal generator 1002 is responsive to the phase difference-indicative signal $S_{102}$.

Figure 23:
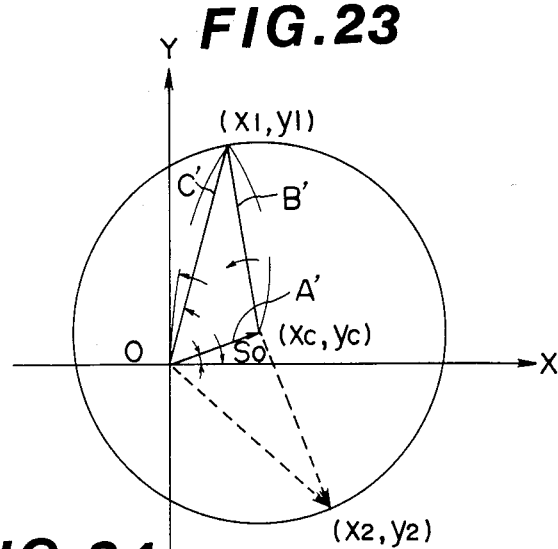
FIG. 23 shows the logic of detection of the background noise influence on detection of terrestrial magnetism in the drive guide system of FIG. 21.

The sine-wave signal $S_{101}$ is fed to the multiplier 1004. The multiplier 1004 also receives an arithmetic signal $S_{103}$ from the arithmetic circuit 1006, which arithmetic signal $S_{103}$ is representative of the reference signal level determined in a manner illustrated in FIG. 23. The method of determination of the value of the signal $S_{103}$ will be described herebelow with reference to FIG. 23. As will be appreciated from FIG. 23, the vector C' is obtained by adding the vectors A' and B'. The vector A' is representative of the background noise created by the vehicle body magnetic field. B' is representative of the terrestrial magnetic field and therefore the magnitude thereof is constant. The vector B' rotates about a center $(x_c, y_c)$ determined by the direction and magnitude of the vector A'. Therefore, by determining the rotational center $(x_c, y_c)$, the magnitude and the direction of the background noise can also be determined. A circle with a rotational center $(x_c, y_c)$ and a radius of the magnitude of the vector B' can be expressed by the following equation:

$$(x-x_c)^2+(y-y_c)^2=R^2$$

Picking two points $(x_1, y_1)$ and $(x_2, y_2)$ on the circle, the foregoing equation can be rewritten as follows:

$$(x_1-x_c)^2+(y_1-y_c)^2=R^2$$

$$(x_2-x_c)^2+(y_2-y_c)^2=R^2$$

The rotational center $(x_c, y_c)$ of the vector B' is thus obtained by solving the foregoing simultaneous equations. In practice and for accuracy of the determination of the rotational center, the foregoing calculation may be repeated several times and the average value may be regarded as representative of the rotational center. Based on the determined rotational center ($x_c$, $y_c$), the magnitude of the vector A' which is, in other words, the level $S_0$ of the background noise, and the direction of the noise component can be determined from the following formulae:

$$S_0 = \sqrt{x_c^2 + y_c^2}$$

$$\theta = \tan^{-1}\frac{y_0}{x_0}$$

Thus, in the arithmetic circuit 1006, the foregoing calculation is performed and arithmetic signal $S_{103}$ having a value representative of the magnitude of the background noise is produced. At the same time, the arithmetic circuit 1006 also produces a phase difference-indicative signal $S_{102}$ having a value indicative of the direction of the background noise.

Returning to FIG. 22, the arithmetic circuit 1006 outputs the phase difference-indicative signal $S_{102}$ thus determined to the sine-wave signal generator 1002 and the arithmetic signal $S_{103}$ to the multiplier 1004. Based on the sine-wave signal $S_{101}$ from the sine-wave signal generator 1002 and the arithmetic signal $S_{103}$, the multiplier modulates a correction signal $S_{104}$ representative of the background component. The correction signal $S_{104}$ is fed to the subtracting circuit 1008 which, in turn, receives the terrestrial magnetism-indicative signal $S_1$ from the direction sensor 10. In the subtracting circuit 1008, the background noise component is eliminated from the terrestrial magnetism-indicative signal $S_1$ to eliminate the influence of the background noise from the detector output. Thus, by means of the correction circuit, the terrestrial magnetism-indicative signal $S_1$ is corrected to eliminate the influence of the background noise.

Figure 24:
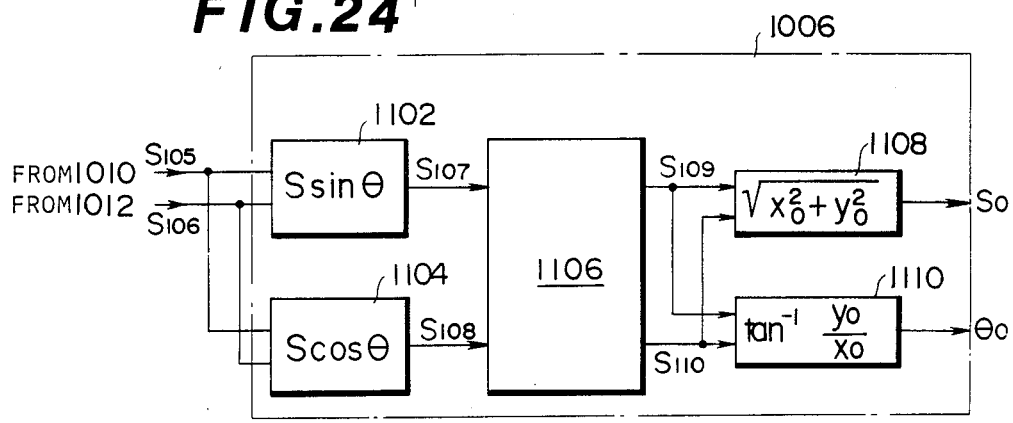
FIG. 24 is a block diagram of an arithmetic circuit in the drive guide system of FIG. 21.
Figure 25:
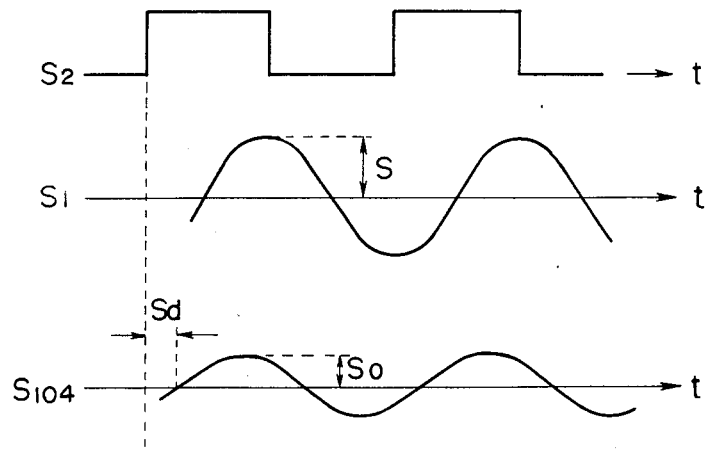
FIG. 25 is a timing chart of operation of the correction circuit of FIG. 22.

FIG. 24 shows an example of the arithmetic circuit 1006 which performs the foregoing calculation and FIG. 25 shows the method of producing the correction signal $S_{104}$.

As shown in FIG. 24, the arithmetic circuit 1006 comprises arithmetic elements 1102, 1104, 1106, 1108 and 1110. The arithmetic elements 1102 and 1104 are both connected to the level detector 1010 and the phase detector 1012 to receive therefrom detector signals $S_{105}$ and $S_{106}$. The arithmetic element 1102 is adapted to calculate the x-coordinates at the end of the foregoing vector C' on the circle and therefore is adapted to calculate S x sin $\theta$. Similarly, the arithmetic element 1104 is adapted to determine the y-coordinate of the vector C' on the circle and therefore is adapted to calculate S x cos $\theta$. Each of arithmetic elements 1102 and 1104 produces a co-ordinate-indicative signal $S_{107}$ and $S_{108}$ respectively representative of the determined x- and y-coordinates at the end of the vector C'.

The co-ordinate indicative signals $S_{107}$ and $S_{108}$ are fed to the arithmetic element 1106. The arithmetic element 1106 evaluates the foregoing simultaneous equations based on the signal values of the co-ordinate-indicative signals $S_{107}$ and $S_{108}$. In this manner the x- and y-coordinates of the rotational center ($x_c$, $y_c$) are obtained. The arithmetic element 1106 thereby produces the center coordinate-indicative signals $S_{109}$ and $S_{110}$ respectively representative of the x- and y-coordinates of the rotational center. The center coordinate-indicative signals $S_{109}$ and $S_{110}$ are both outputted to both of the arithmetic elements 1108 and 1110. The arithmetic element 1108 is adapted to solve the following equation:

$$S_0 = \sqrt{x_c^2 + y_c^2}$$

Similarly, the arithmetic element 1110 solves the following equation:

$$\theta_d = \tan^{-1}\frac{y_c}{x_c}$$

Based on the results of these calculations, the arithmetic element 1108 produces the arithmetic signal $S_{103}$ and the arithmetic element 1110 produces the phase difference-indicative signal $S_{102}$.

As shown in FIG. 25, the multiplier function for modulating the correction signal $S_{104}$ is performed by modulating the sine-wave signal produced by a phase lag $\theta_d$ according to the phase difference-indicative signal $S_{102}$, with the signal level of the arithmetic signal $S_{103}$. This correction signal reflects the phase and signal level of the terrestrial magnetism-indicative signal $S_1$ but with adjusted values of both.

It should be appreciated that the correction circuit 100 may comprise a microcomputer for performing the foregoing calculations instead of the analog circuits set forth with reference to FIG. 24.

In the shown embodiment, the timing at which to carry out the correction of the terrestrial magnetism-indicative signal value can be determined in various ways. In one way, the correction is performed when the detected vehicle direction is same as one of preselected directions. In this case, the detector signal $S_{106}$ of the phase detector 1012 is compared with predetermined thresholds to make the arithmetic circuit 1006 operative to perform the correction when the detector signal value becomes equal to one of the threshold.

In another example, the correction circuit may include an error detector of the sort shown in FIG. 15 to indicate conditions in which the error in detection of the vehicle direction beyond a predetermined allowable range to produce an alarm signal $S_{107}$ to operate an alarm unit 101 as illustrated in FIG. 21 with phantom line. In this case, the correction circuit 100 may be manually operated when the alarm unit 101 is operative or may be responsive to the alarm signal serving as the correction command to perform the correction in response thereto.

Furthermore, the correction may be performed at a predetermined constant time interval or per every predetermined travelling distance.

Figure 26:
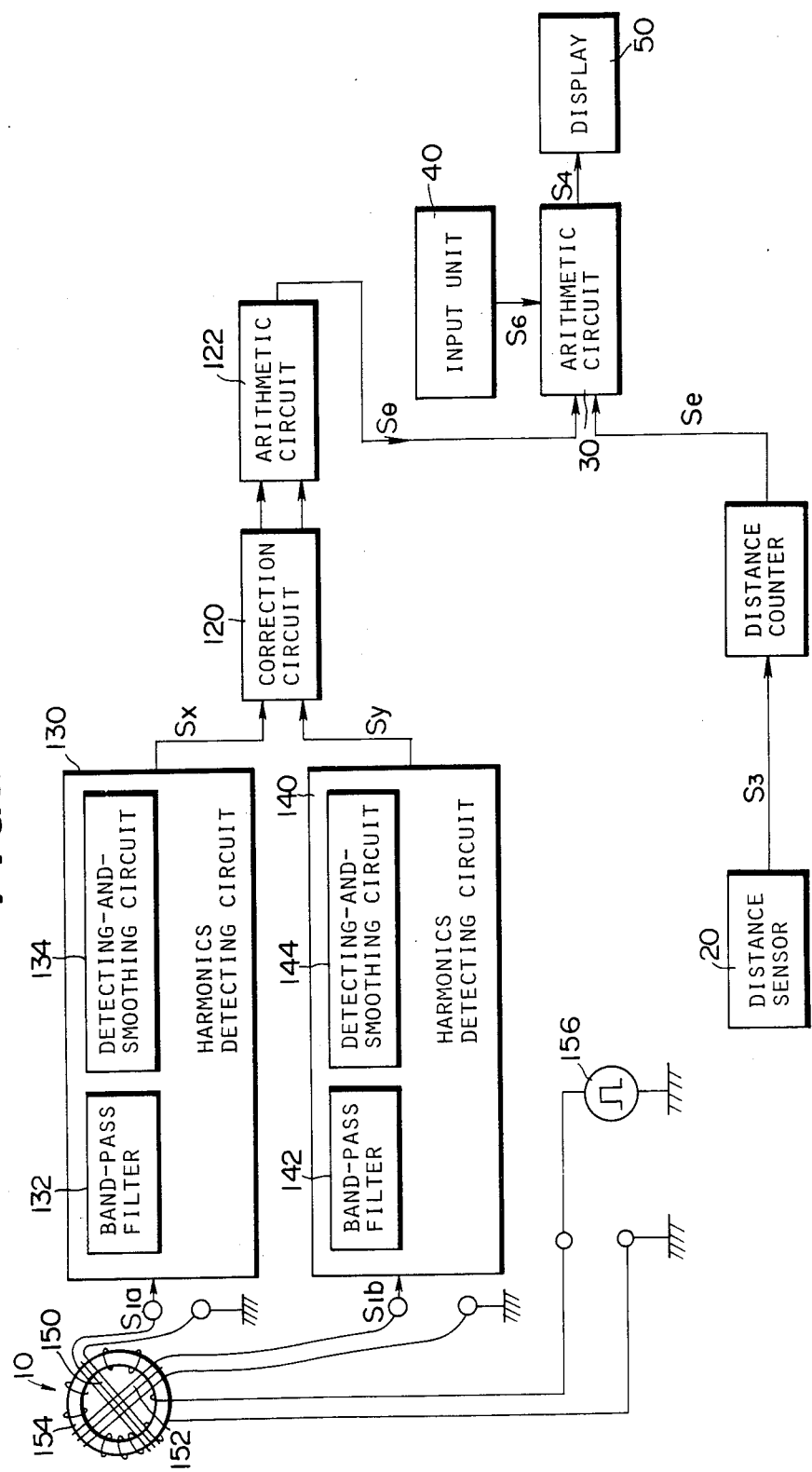
FIG. 26 is a schematic block diagram of the third embodiment of the drive guide system according to the present invention.

FIG. 26 shows the third embodiment of the drive guide system according to the present invention. In this embodiment, a correction circuit 120 is connected to the direction sensor 10 via a pair of harmonics-detecting circuits 130 and 140. The correction circuit 120 is, in turn, connected to an arithmetic circuit 122 which is adapted to output a direction signal $S_\theta$ to the arithmetic circuit 30 as a substitute for the phase detector 60 in the foregoing first and second embodiments.

As apparent from FIG. 26, in the direction sensor 10 of this embodiment, a pair of magnetic coils 150 and 152 are wound around a magnetic core 112. The magnetic coils 150 and 152 are so arranged as to cross each other at right angles. In addition, a magnetic coil 154 is wound around the periphery of the magnetic core 112. The magnetic coil 154 is connected to an oscillator 156 which produces a pulse signal with a given constant frequency, or an alternating current. As a result, the magnetic coil 154 is excited to induce voltages across each of the magnetic coils 150 and 152 at a frequency corresponding to that of the oscillator frequency.

The output of the direction sensor in the absence of external magnetic fields represents odd-numbered harmonic components of the induced signal. On the other hand, in the presence of external magnetic fields, the output of the direction sensor 10 represents the even-numbered harmonic components of the induced signal. The signal level of the direction sensor output is proportional to the magnitude of the external magnetic field.

Each of the harmonics-detecting circuits 130 and 140 are connected to one of the magnetic coils 150 and 152 to receive the corresponding output signal. The harmonics-detecting circuit 130 comprises a band-pass filter 132 and a detecting-and-smoothing circuit 134 which detect the even-numbered harmonic components in the direction sensor output $S_{1a}$ from the geomagnetic coil 150. Likewise, the harmonics detecting circuit 140 comprises a band-pass filter 142 and a detecting-and-smoothing circuit 144 which detect the even-numbered harmonic components in the direction sensor output $S_{1b}$ from the geomagnetic coil 152. The harmonics-detecting circuits 130 and 140 thus output direct current signals $S_x$ and $S_y$ respectively having voltages proportional to the magnitude of the even-numbered harmonic components of the corresponding magnetic induction signal.

Figure 27:
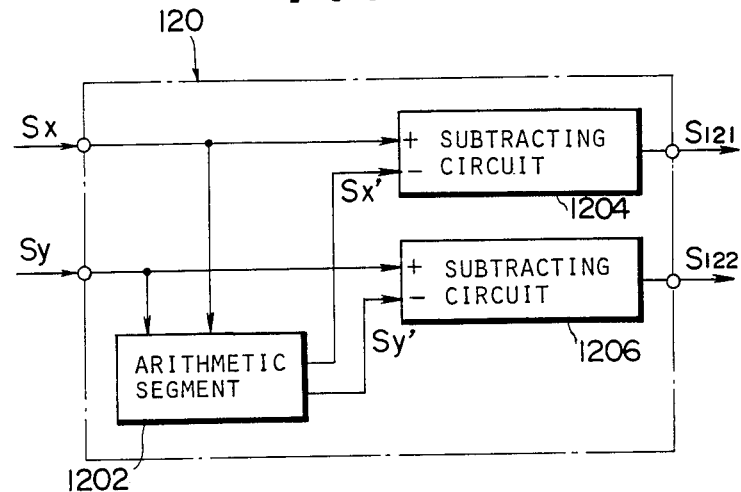
FIG. 27 is a block diagram of the correction circuit in the drive guide system of FIG. 26.
Figure 28:
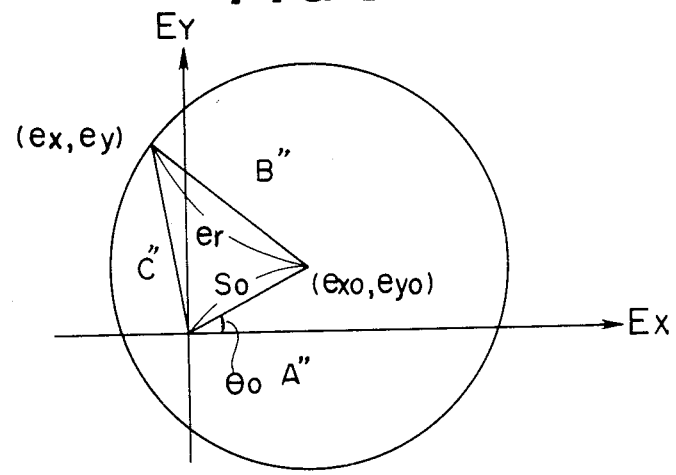
FIG. 28 is an illustration similar to FIG. 23 showing the logic of detection of the background noise influence on detection of the vehicle orientation.

As shown in FIG. 27, the correction circuit 120 comprises an arithmetic unit 1202 and a pair of subtracting circuits 1204 and 1206. The arithmetic unit 1202 receives the signals $S_x$ and $S_y$ from the harmonics-detecting circuits 130 and 140. As shown in FIG. 28, the values ($e_x$, $e_y$) of the signals $S_x$ and $S_y$ respectively represent x- and y-coordinates of the end of vector C" which is obtained by adding the vector A" and the vector B". As set forth previously with respect to FIGS. 19 and 23, the vector A" represents the magnitude and direction of interference due to the vehicle magnetism and the vector B represents the magnitude and direction of the terrestrial magnetism sensed by the direction sensor 10. Assuming the co-ordinates at the center of the vector B" rotation are $e_{x0}$ and the $e_{y0}$, and length of vector B" is $e_r$, the circle described by the end of the vector B" may be represented by the following equation:

$$(e_x - e_{x0})^2 + (e_y - e_{y0})^2 = e_r^2$$

Therefore, as set forth previously, by solving simultaneous equations with respect to two specified points on the circle according to the foregoing equation, the co-ordinates of the $e_{x0}$ and $e_{y0}$ can be obtained. As will be appreciated, since point $e_{x0}$, $e_{y0}$ also represents the coordinates of the end of the vector A", the magnitude and direction of the vector A" can be determined based on the determined co-ordinates $e_{x0}$ and $e_{y0}$. The arithmetic segment 1202 processes the signals $S_x$ and $S_y$ according to the foregoing process to produce signals $S_x'$ and $S_y'$ respectively representative of $e_{x0}$ and $e_{y0}$. The signals $S_x'$ and $S_y'$ produced by the arithmetic unit 1202 are respectively outputted to the negative (−) terminals of the subtracting circuits 1204 and 1206. On the other hand, the subtracting circuits 1204 and 1206 receive at their positive (+) terminals the signals $S_x$ and $S_y$ from the harmonics-detecting circuits 130 and 140, respectively. In the subtracting circuits 1204 and 1206, the interference components of the director sensor signals are corrected. The subtracting circuits 1204 and 1206 respectively produce corrected direction signals $S_{121}$ and $S_{122}$ having values $x_c$ and $y_c$.

As set forth previously, the arithmetic circuit 122 processes the corrected direction signals $S_{121}$ and $S_{122}$ in accordance with the equation:

$$\theta_d = \tan^{-1} \frac{x_c}{y_c}$$

In this manner, the vehicle orientation is detected and the arithmetic circuit produces the direction-indicative signal $S_\theta$ which is corrected for interference due to the vehicle magnetism.

Figure 29:
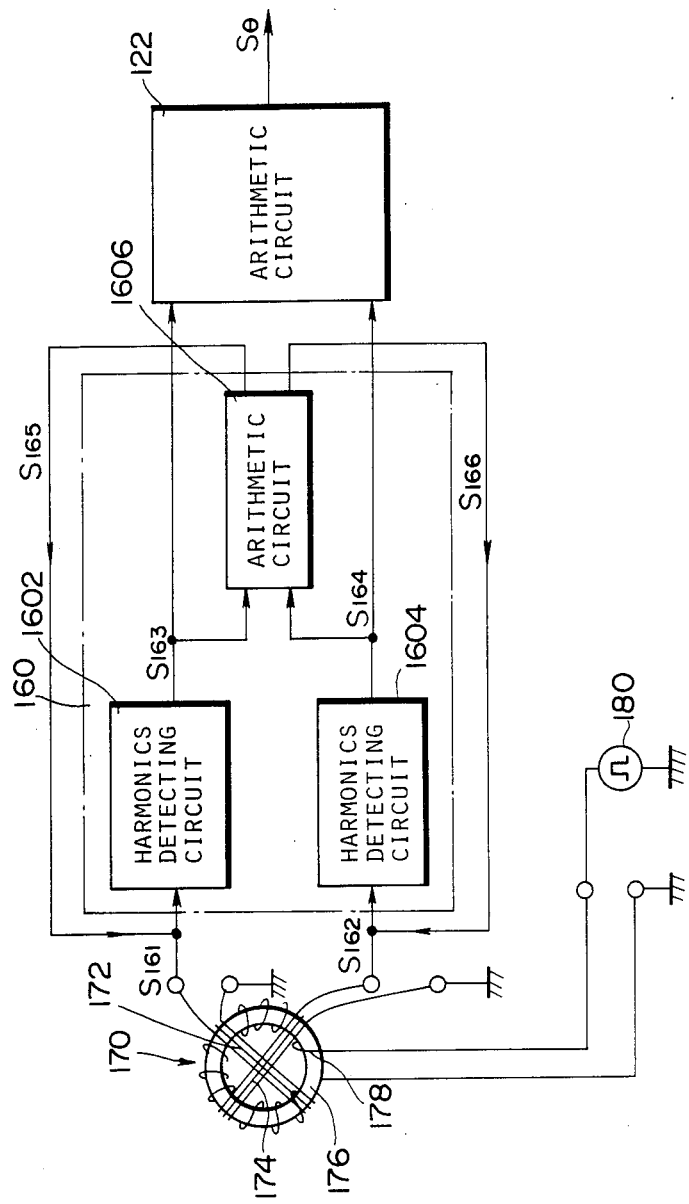
FIG. 29 is a schematic block diagram of the fourth embodiment of the drive guide system according to the invention.

Referring to FIG. 29, the fourth embodiment of the drive guide system according to the present invention is illustrated, in which the direction sensor signal is corrected by a correction circuit 160. The correction circuit 160 comprises a pair of harmonics-detecting circuits 1602, 1604 and an arithmetic circuit 1606. In this embodiment, non-rotary-type direction sensor 170 is employed to detect terrestrial magnetism. As in the foregoing third embodiment, the direction sensor 170 has a pair of magnetic coil 172 and 174 respectively wound about the magnetic core 176. The magnetic coils 172 and 174 are arranged to cross each other at right angles. In addition, a magnetic coil 178 is wound around the circumference of the magnetic core 176. The magnetic coil 178 is connected to the oscillator 180 which is adapted to produce a pulse signal of a given frequency or an alternating current to periodically energize the magnetic coil. As a result, the magnetic coils 172 and 174 are excited to generate induced signal voltages at a frequency corresponding to the differentiated oscillator frequency.

The induced signals $S_{161}$ and $S_{162}$ in the direction sensor 170 are respectively fed to the harmonics-detecting circuits 1602 and 1604. The harmonics-detecting circuits 1602 and 1604 are respectively adapted to produce a direct current having voltages proportional to the magnitude of the even-numbered harmonic components of the induced signals $S_{161}$ and $S_{162}$. The harmonics-detecting circuits produce the signals $S_{163}$ and $S_{164}$ respectively in direct current form as set forth previously and having voltages representative of the magnitude of the even-numbered harmonic components of the induced signals $S_{161}$ and $S_{162}$. The signal values of the signals $S_{163}$ and $S_{164}$ correspond to the x- and y-coordinates components respectively of the vector representing the detector signal including background noise, as set forth with respect to FIG. 27. The arithmetic circuit 1606 thus produces the signals $S_{165}$ and $S_{166}$ indicative of the background components in the signal in inverted form. The signals $S_{165}$ and $S_{166}$ are fed back to the harmonics-detecting circuits 1602 and 1604. As a result of this feedback signal, the input signal value of the signals $S_{161}$ and $S_{162}$ from the detection sensor 170 is directly adjusted so as to eliminate the influence of the background noise. The arithmetic circuit 122 processes the signals $S_{165}$ and $S_{166}$ to produce the direction-indicative signal $S_\theta$ indicative of the vehicle orientation.

While the specific embodiments have been described hereabove in order to explain the present invention for better understanding, the invention has not been intended to be limited to the specific embodiments of the invention and can be modified or embodied otherwise without departing from the principles of the invention as set forth.

What is claimed is:

1. A direction sensor with an error monitor comprising:
    first means for detecting the orientation of the terrestrial magnetism and producing a periodic first signal indicative of the direction of terrestrial magnetism, said first signal having a signal phase which varies with a change in said orientation relative to said sensor and said first signal having a signal level proportional to the magnitude of the terrestrial magnetic field;
    second means for producing a second signal having a level representative of a predetermined reference value, which predetermined reference value is determined based on an initial signal level of said first signal under conditions in which an initial background noise exists at a predetermined signal phase of said first signal; and
    third means for detecting a subsequent signal level of said first signal at said predetermined signal phase thereof, said third means comparing said detected subsequent first signal level to said second signal level to determine the difference between the signal levels, and said third means producing a third signal when said first signal level is above said second signal level.

2. The sensor as set forth in claim 1, which further comprises fourth means for producing an alarm in response to said third signal.

3. The sensor as set forth in claim 1, wherein said first means is adapted to produce a direction-indicative reference signal having a signal phase different from the signal phase of said first signal, which difference corresponds to the orientation of the sensor with respect to a predetermined direction, and produces a phase difference-indicative signal.

4. The sensor as set forth in claim 3, wherein said third means is responsive to the phase difference-indicative signal corresponding to the difference between the signal phase of said direction-indicative reference signal and said predetermined signal phase of the first signal to compare said first signal level with said second signal level.

5. The sensor as set forth in claim 4, which further comprises fourth means, responsive to said phase difference-indicative signal, for producing a correction signal having a value corresponding to a background noise level, which fourth means determines said correction signal value based on said first signal level, and fifth means for correcting said first signal level with said correction signal.

6. A direction sensor with an error monitor comprising:
    first means for producing a first signal having a value proportional to the magnitude of a first component of the terrestrial magnetic field and a second signal having a value proportional to the magnitude of a second component of the terrestrial magnetic field, phase of said second component being offset from the phase of said first component by 90°;
    second means for determining a background noise component in the value of the terrestrial magnetic field indicated by said first and second signal values and producing a correction signal for correcting said first and second signal values to eliminate the background noise component therefrom; and
    third means for producing a direction-indicative signal having a value corresponding to a detected direction, said third means being responsive to said first and second signals to arithmetically determine said direction-indicative signal value based on said first and second signal values.

7. The sensor as set forth in claim 6, wherein said first means includes a first magnetic element and second magnetic element which are cyclically excited by application of power which alternates between a high level and a low level at a given interval, said first and second elements being adapted to produce signals respectively having harmonic components depending upon an external magnetic field.

8. The sensor as set forth in claim 7, wherein said first means comprises a magnetic core, a first magnetic coil transversely wound around said magnetic core, a second magnetic coil transversely wound around said magnetic core at right angles to said first geomagnetic coil, and a magnetic coil adapted to receive said power to be cyclically excited to induce said first and second signals.

9. The sensor as set forth in claim 8, wherein said third means receives said correction signal to correct said first and second signal values by said correction signal value.

10. A direction sensor with an error monitor comprising:
    first means for producing a first signal having a value proportional to the magnitude of a first component of a terrestrial magnetism and a second signal having a value proportional to the magnitude of a second component of the terrestrial magnetism, the phase of said second component being offset from that of said first component by 90°;
    second means for detecting a background noise component in the detected terrestrial magnetism based on said first and second signal values, said second means producing correction signals respectively corresponding to the background noise components in said first and second component phases;
    third means for correcting said first signal value by the corresponding phase of said correction signal, and for correcting said second signal value by the corresponding phase of the other correction signal value; and
    fourth means for receiving said corrected first and second signals to produce a direction-indicative signal based on said corrected first and second signal values.

11. The sensor as set forth in claim 10, wherein said first means includes a first magnetic element and a second magnetic element which are cyclically excited to induce signals which alternate between a high level and a low level at a given interval, said first and second elements being adapted to produce signals respectively having harmonic components depending upon an external magnetic field.

12. The sensor as set forth in claim 11, wherein said first means comprises a magnetic core, a first magnetic coil transversely wound around said magnetic core, a second magnetic coil transversely wound said magnetic core at right angles to said first geomagnetic coil, and a magnetic coil adapted to receive power to be cyclically excited to induce said first and second signals on said first and second magnetic coils.

13. The sensor as set forth in claim 11, wherein said fourth means comprises detectors connected to said first and second magnetic elements of said first means and also connected to said second means to receive said corrected first and second signal therefrom.

14. A compass comprising:
   means for measuring terrestrial magnetism and for generating a first signal indicative of the direction of the terrestrial magnetism;
   means for generating a second signal representative of a predetermined reference value, said second signal being based on an initial signal level of the first signal representing an initial background noise; and
   means for detecting the signal level of said first signal at a predetermined phase thereof, and comparing said detected first signal level to said second signal to determine the difference between the first signal level and said reference value for producing a third signal when said first signal level is above the reference value.

15. A compass comprising:
   means for producing a first signal representing a first component of a terrestrial magnetic field and a second signal representing a second component of the terrestrial magnetic field;
   means for determining a background noise component of the terrestrial magnetic field indicated by values of said first and second signal and for producing a correction signal for correcting said first and second signal values; and
   means for producing a direction-indicative signal on the basis of said first and second signal values and said correction signal.

16. A direction sensor with an error monitor comprising:
   means for detecting the orientation of a horizontal component of terrestrial magnetism and producing a periodic first signal the phase of which corresponds to the direction of terrestrial magnetism, said first signal being indicative of the magnitude of the terrestrial magnetic field;
   means for producing a second signal indicative of a predetermined reference value which corresponds to the magnetic field magnitude which should be indicated by said first signal at a predetermined signal phase at which a background noise exists; and
   means for detecting the magnetic field magnitude indicated by said first signal at said predetermined phase thereof, comparing said detected magnitude to said reference value to determine the difference therebetween, and producing a third signal when said detected magnitude exceeds said reference value.

17. A direction sensor with an error monitor comprising:
   means for producing a first signal indicative of the magnitude of a first component of a terrestrial magnetic field and a second signal indicative of the magnitude of a second component of the terrestrial magnetic field, the phase of said second component being offset from the phase of said first component by 90°;
   means for determining a predetermined background noise component in the terrestrial magnetic field indicated by said first and second signals and producing a correction signal for correcting said first and second signals to eliminate the background noise component therefrom; and
   means responsive to said first and second signals to arithmetically determine a direction-indicative signal indicative of an orientation of the direction sensor within said terrestrial magnetic field.

18. A direction sensor with an error monitor comprising:
   means for producing a first signal indicative of the magnitude of a first component of a terrestrial magnetism and a second signal indicative of the magnitude of a second component of the terrestrial magnetism, the phase of said second component being offset from that of said first component by 9°;
   means for detecting an invariant background noise component in the detected terrestrial magnetism based on said first and second signals, and producing correction signals respectively corresponding to the background noise components in said first and second component phases;
   means for correcting said first signal by the corresponding phase of said correction signal, and for correcting said second signal by the corresponding phase of the other correction signal value; and
   means for receiving said corrected first and second signals to produce a direction-indicative signal based on said corrected first and second values.

* * * * *